(12) United States Patent
Makino et al.

(10) Patent No.: US 8,272,354 B2
(45) Date of Patent: Sep. 25, 2012

(54) FUEL TANK SYSTEMS

(75) Inventors: Katsuhiko Makino, Aichi-ken (JP);
Masanobu Shinagawa, Aichi-ken (JP);
Osamu Fujimura, Nagoya (JP); Shigeki Yamada, Nagoya (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 1072 days.

(21) Appl. No.: 12/174,981

(22) Filed: Jul. 17, 2008

(65) Prior Publication Data
US 2009/0025805 A1 Jan. 29, 2009

(30) Foreign Application Priority Data

Jul. 25, 2007 (JP) ................. 2007-192996

(51) Int. Cl.
*F01P 9/00* (2006.01)
(52) U.S. Cl. .............. 123/41.01; 220/562; 220/592.2
(58) Field of Classification Search .......... 123/41.01, 123/14.56; 202/562, 564, 592, 592.2, 592.27
See application file for complete search history.

(56) References Cited

U.S. PATENT DOCUMENTS

| | | | | |
|---|---|---|---|---|
| 3,877,496 A | * | 4/1975 | Sperberg | 141/4 |
| 4,157,700 A | * | 6/1979 | Conner | 123/557 |
| 4,503,833 A | * | 3/1985 | Yunick | 123/545 |
| 4,626,197 A | * | 12/1986 | Kumazawa et al. | 431/302 |
| 4,862,859 A | * | 9/1989 | Yunick | 123/545 |
| 6,269,639 B1 | * | 8/2001 | Conrad | 60/520 |
| 2006/0023480 A1 | * | 2/2006 | Plummer | 363/146 |

FOREIGN PATENT DOCUMENTS

| | | |
|---|---|---|
| JP | 490425 | 8/1992 |
| JP | 2001130272 | 5/2001 |
| JP | 2001132570 | 5/2001 |
| JP | 2001138758 | 5/2001 |
| JP | 2006199072 | 8/2006 |

* cited by examiner

*Primary Examiner* — John Kwon
(74) *Attorney, Agent, or Firm* — Dennison, Schultz & MacDonald

(57) ABSTRACT

A fuel tank system includes a fuel tank that has a tank wall defining a fuel storage space. A heat control chamber is formed within the tank wall. A pressure control device can control a pressure within the heat control chamber in response to a difference between a temperature within the fuel storage space and a temperature externally of the tank wall.

17 Claims, 4 Drawing Sheets

FUEL TANK SYSTEMS

This application claims priority to Japanese patent application serial number 2007-192996, the contents of which are incorporated herein by reference.

BACKGROUND OF THE INVENTION

Field of the Invention

The present invention relates to fuel tank systems, and in particular to fuel tank systems including a fuel tank that has a double-wall structure including an inner tank wall and an outer tank wall defining an intermediate space therebetween.

Japanese Laid-Open Utility Model Publication No. 4-90425 and Japanese Laid-Open Patent Publication Nos. 2006-199072, 2001-132570 and 2001-138758 disclose fuel tanks each having a double-wall structure provided on at least a part of the fuel tank. In a high-temperature environment, such as summer and a tropical area, the temperature within the fuel tank may raise to cause increase in the amount of generation of fuel vapor within the fuel tank. In such a case, a problem may be caused that the necessary amount of the liquid fuel to be supplied from a canister for replenishing with the vaporized amount exceeds the ability of the canister. In order to solve this problem, it is necessary to increase the capacity of the canister. Therefore, the fuel tanks of the above publications incorporate a double-wall structure for improving the heat insulation property.

More specifically, the lower half of the fuel tank of Japanese Laid-Open Utility Model Publication No. 4-90425 has a double-wall structure. Air or a heat insulation material, such as glass wool, is filled within an intermediate space defined between an inner tank wall and an outer tank wall in order to improve the heat insulation property against the external air. The entire fuel tank of Japanese Laid-Open Patent Publication No. 2001-138758 is formed to have a double-wall structure. In order to improve the heat insulation property against the external temperature, air is filled within the intermediate space. Because air has a low heat transfer efficiency, the filled air can form a heat insulation layer. The entire fuel tank of Japanese Laid-Open Patent Publication No. 2001-132570 also is formed to have a double-wall structure. As a heat insulation material, a porous material, such as a foam resin, is filled within the intermediate space. In addition, Peltier units are disposed within a fuel supply passage communicating with a pump unit and within a vapor passage in order to cool the fuel. Also, the entire fuel tank of Japanese Laid-Open Patent Publication No. 2001-138758 has a double-wall structure. Two shutters are disposed on the outer tank wall to enable communication between the intermediate space and an external environment. Temperature sensors can detect the temperature within the fuel tank and the temperature of the external environment. If the temperature of the external environment is lower than the temperature within the inner tank wall, the shutters are opened to introduce the external air into the intermediate space. On the other hand, if the temperature of the external environment is higher than temperature within the inner tank wall, the shutters are closed to produce a heat insulation layer by the air within the intermediate space.

However, under the low-temperature environmental condition, such as winter or a cold area, or if the exhaust heat from an engine or a fuel pump is transferred to the fuel tank, it may be possible that the temperature within the fuel tank, i.e., the temperature within the inner tank wall, becomes higher than the temperature externally of the fuel tank. In such a case, it may be desirable to dissipate the heat within the fuel tank or to cool within the fuel tank by using the external air.

In the case of Japanese Laid-Open Utility Model Publication No. 4-90425 and Japanese Laid-Open Patent Publication No. 2006-199072, it is not possible to dissipate the heat when the temperature within the inner tank wall is higher than the temperature externally of the fuel tank, although it is possible to deal with the situation where the temperature within the inner tank wall is lower than the temperature externally of the fuel tank, by improving the heat insulating property. Rather, the temperature within the inner tank wall may not be lowered due to the heat insulating property. Also, in the case of Japanese Laid-Open Patent Publication No. 2001-132570, the heat dissipating ability is low although it is possible to insulate the heat by the heat insulating material disposed within the intermediate space. The Peltier units may forcibly cool the fuel but may lead to increase in number of parts and complexity of the structure of the fuel tank. In addition, because one of the Peltier units is disposed within a circulation path that is branched from a fuel supply passage, a possibility may exist that the amount of supply of fuel (fuel pressure) is decreased. In order to compensate for this decrease in the amount of supply of fuel, it is necessary to increase the size of the pump unit. Therefore, the techniques disclosed in these publications do not effectively utilize the difference between inside and outside of the fuel tank.

According to the technique of Japanese Laid-Open Patent Publication No. 2001-138758, in the case that the temperature of the inside of the inner tank wall is higher than the temperature externally of the fuel tank, it is possible to introduce the external air into the intermediate space in order to cool the inside of the inner tank wall. However, because the intermediate space communicates with the external air by two openings only, the air may not reliably flow into and out of the intermediate space. If the air does not flow into and out of the intermediate space, the cooling effect may be lost. Even if the air can flow into and out of the intermediate space via the openings, such communication of air between the intermediate space and the outside of the fuel tank may naturally lead to low efficiency in terms of the heat insulation and the heat dissipation.

Therefore, there has been a need for a fuel tank system that is improved in the heat insulation property and the heat dissipation property of a fuel tank.

SUMMARY OF THE INVENTION

One aspect according to the present invention includes a fuel tank system including a fuel tank that has a tank wall defining a fuel storage space. A heat control chamber is formed within the tank wall. A pressure control device can control a pressure within the heat control chamber in response to a difference between a temperature within the fuel storage space and a temperature externally of the tank wall. The reduction in pressure within the heat control chamber can be used for improving the dissipation of heat from within the fuel storage pace to the external environment.

DETAILED DESCRIPTION OF THE INVENTION

Figure 1:
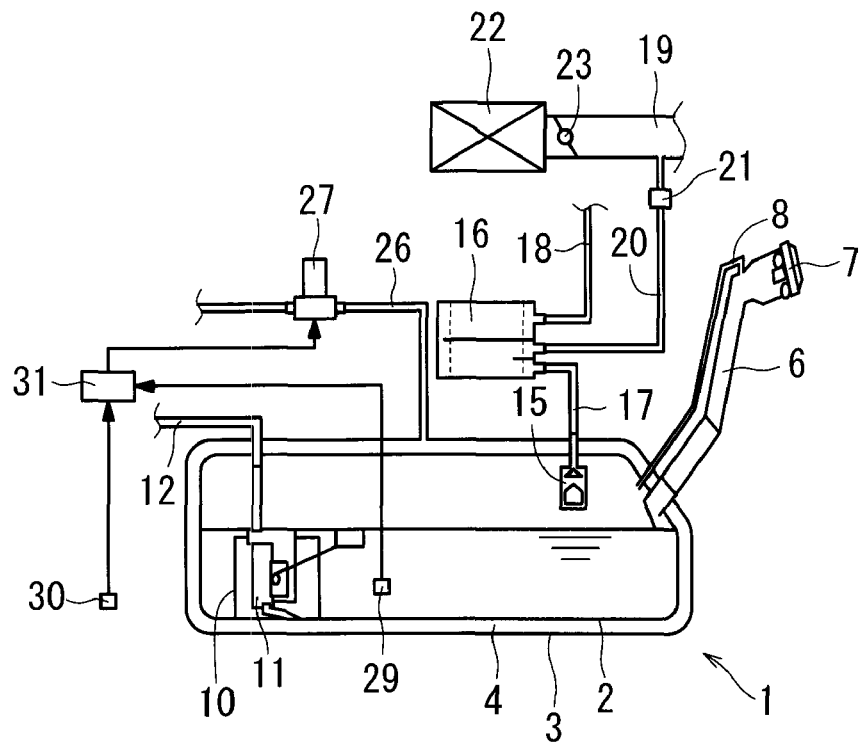
FIG. 1 is a structural view of a fuel tank system according to a first embodiment of the present invention.

Each of the additional features and teachings disclosed above and below may be utilized separately or in conjunction with other features and teachings to provide improved fuel tank systems. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a fuel tank system includes a fuel tank and a control device. The fuel tank includes an inner tank wall and an outer tank wall covering at least a part of the inner tank wall. The outer tank wall is spaced from the inner tank wall by a predetermined distance, so that an intermediate space is defined between the inner tank wall and the outer tank wall. In other words, at least a part of the fuel tank has a double-wall structure. For example, a lower part of the fuel tank or the entire fuel tank may have a double-wall structure. The control device can change heat transfer efficiency within the intermediate space.

With this arrangement, it is possible to effectively insulate the inner space of the inner tank wall, i.e., a fuel storage space, depending on the external temperature.

The control device may decrease the heat transfer efficiency within the intermediate space when an external temperature externally of the outer tank wall is higher than a temperature within the inner tank wall. On the other hand, the control device may increase the heat transfer efficiency within the intermediate space when an external temperature externally of the outer tank wall is lower than a temperature within the inner tank wall.

Thus, if the external temperature is higher than the temperature within the inner tank wall, the heat transfer efficiency may be decreased to inhibit the transfer of heat between inside and outside of the fuel tank, so that insulation of heat can be effectively performed. On the other hand, if the external temperature is lower than the temperature within the inner tank wall, the heat transfer efficiency may be increased to enhance the transfer of heat between inside and outside of the fuel tank, so that dissipation of heat can be effectively performed.

The control device may include an introduction/evacuation device that can change the heat transfer efficiency within the intermediate space by using air as a heat transfer medium. The introduction/evacuation device can evacuate an internal air within the intermediate space to an external environment when an external temperature externally of the outer tank wall is higher than a temperature within the inner tank wall. On the other hand, the introduction/evacuation device can introduce an external air externally of the outer tank wall into the intermediate space when the external temperature is lower than the temperature within the inner tank wall.

In this way, the air, i.e., the heat transfer medium, is evacuated from the intermediate space when the external temperature is higher than the temperature within the inner tank wall. Because the air within the intermediate space is decreased, the heat transfer efficiency within the intermediate space is decreased, so that the inner space of the inner tank wall, i.e., the fuel storage space, can be reliably thermally insulated. The thermal insulation effect can be increased as the pressure within the intermediate space becomes close to a vacuum pressure. On the other hand, the air is introduced into the intermediate space when the external temperature is lower than the temperature within the inner tank wall. Because the external cool air is introduced into the intermediate space, it is possible to cool the fuel tank. In addition, because the heat can be transferred through the air, it is possible to dissipate the heat from the fuel tank. Thus, as the air pressure within the intermediate space is increased, the heat transfer efficiency can be increased.

The fuel tank system may further include an air discharge device. The air discharge device may include a discharge passage and a valve disposed in the discharge passage. The valve is closed when the external temperature is higher than the temperature within the inner tank wall. The valve is opened when the external temperature is lower than the temperature within the inner tank wall, so that the external air flowing into the intermediate space by the operation of the introduction/evacuation device can flow further to the external environment via the discharge passage.

Therefore, the external air that has entered the intermediate space and has heated by the fuel tank may be discharged to the external environment. In addition, because the air flowing through the intermediate space has increased heat transfer efficiency, it is possible to further effectively lower the temperature of the fuel tank.

In another embodiment, a fuel tank system includes the fuel tank, a pressure control device and a heat conductive member. The pressure control device is operable to change the pressure within the intermediate space of the fuel tank. The heat conductive member having a high heat conductivity is supported on the outer tank wall via a resilient member, so that the heat conductive member can move toward and away relative to the inner tank wall. The heat conductive member is positioned away from the inner tank wall by a biasing force of the resilient member when the external temperature is higher than the temperature within the inner tank wall. On the other hand, the pressure control device can reduce the pressure within the intermediate space to move the heat conductive member to contact with the inner tank wall against the biasing force of the resilient member when the external temperature is lower than a temperature within the inner tank wall.

With this arrangement, when the heat conductive member is positioned away from the inner tank wall, the intermediate space can serve as a thermal insulation layer. Therefore, it is possible to thermally insulate the inner space, i.e., a fuel storage space, within the inner tank wall. On the other hand, when the heat conductive member is positioned proximal to the inner tank wall, it is possible to dissipate the heat of the inner tank wall to the external environment via the heat conductive member. Because the heat conductive member can be moved by the operation of the pressure control device, it is not necessary to provide a separate actuation mechanism. Therefore, the construction of the fuel tank system can be simplified.

The introduction/evacuation device or the pressure control device may include an environmental communication passage and a bi-direction pump disposed therein. The environmental communication passage communicates between the intermediate space and the external environment. With this arrangement, the introduction/evacuation device and the pressure control device can have a simple construction.

Alternatively, the introduction/evacuation device and the pressure control device may include a communication passage and a control valve disposed therein. The communication passage communicates between the intermediate space and an internal space of an intake air pipe connected to an internal combustion engine, so that a negative pressure produced by an intake air flowing through the intake air pipe can be applied to the intermediate space for evacuating the air when the control valve is opened. Because this arrangement utilizes the negative pressure of the intake air pipe that is generally provided in an internal combustion engine, the construction of the fuel tank system can be simplified. In particular, because no pump is necessary, no electric power for driving a pump is necessary.

A pressure accumulator may be disposed within the communication passage and between the control valve and the intake air pipe for accumulating the negative pressure produced by the intake air. With this arrangement, it is possible to utilizes the negative pressure stored within the accumulator even in the case that engine is stopped.

The gas permeable material may be filled within at least a part of the intermediate space. Preferably, the gas permeable material has a cushioning property in order to prevent or minimize the damage to the fuel tank when an external force is applied to the fuel tank. Because the air can flow through the gas permeable material, the gas permeable material may not inhibit introduction of the air into the intermediate space and evacuation of the air from the intermediate space. Therefore, dissipation of heat can be reliable performed as the air flows through the gas permeable material.

The fuel tank system may further include a canister disposed within the inner tank wall for adsorbing a fuel vapor produced within the inner tank wall. With this arrangement, it is possible to prevent the canister from being heated to a high temperature. An adsorption material may be contained in the canister. Therefore, potential degradation of the adsorption ability of the adsorption material can be inhibited. This may enable the canister to have a small size.

First Embodiment

A fuel tank system according a first embodiment of the present invention will now be described with reference to FIG. 1. As shown in FIG. 1, a fuel tank 1 has an inner tank wall 2 and an outer tank wall 3 disposed on the outer side of the inner tank wall 2. The outer tank wall 2 encloses the entire outer circumference of the inner tank wall 2. Thus, the fuel tank 1 is configured to have a double-wall structure and can store a liquid fuel, such as gasoline, within the inner space of the inner tank wall 2. Thus, the inner space of the inner tank wall 2 serves as a fuel storage space. An intermediate space 4 is defined between the inner tank wall 2 and the outer tank wall 3. As will be explained later, the pressure within the intermediate space 4 may be increased and decreased. Therefore, each of the inner tank wall 2 and the outer tank wall 3 is designed to have strength enough to withstand the increase or the decrease of pressure within the intermediate space 4.

A fuel filler pipe 7 is connected to the side wall of the fuel tank 1 and is in communication with the inside of the inner tank wall 2. An upper end of the fuel filling pipe 6 defines a fuel filler opening, into which a fuel gun (not shown) can be inserted. A cap 7 is attached to the upper end of the fuel filling pipe 6 for sealingly closing the fuel filler opening when no fuel is to be filled. A gas communication pipe 8 is provided in order to enable the fuel to be smoothly filled within the fuel storage space of the fuel tank 1, i.e., within the inner space of the inner tank wall 2, via the fuel filler pipe 7.

A sub-tank 10 is disposed within the fuel storage space of the fuel tank 1. A pump unit 11 is mounted within the sub-tank 10. A fuel supply passage 12 extends into and out of the fuel tank 1 through the inner and outer tank walls 2 and 3. One end of the fuel supply passage 12 is connected to the pump unit 11. The other end of the fuel supply passage 12 is connected to an engine (not shown). Therefore, the pump unit 11 pumps the fuel within the sub-tank 10 for delivering the fuel to the engine.

A roll-over valve 15 is disposed within an upper region of the fuel storage space of the fuel tank 1 and is in communication with a canister 16 via a vapor passage 17 that extends into and out of the fuel tank 1. Activated carbon (not shown) may be filled within the canister 15. Therefore, when the pressure within the upper region of the fuel storage space of the fuel tank 1 increases, the air containing a fuel vapor may be introduced into the canister 16 from the upper region of the fuel storage space via the roll-over valve 15 and the vapor passage 17. Then, the fuel vapor may be adsorbed by the activated carbon so as to be removed from the air. After removal of the fuel vapor, the air may be discharged to the outside environment via an atmospheric passage 18 that communicates between the canister 15 and the outside environment. The canister 16 is in communication with an intake air pipe 19 via a purge passage 20. The intake air pipe 19 supplies an intake air to the engine. A purge control valve 21 is disposed within the purge passage 20 for opening and closing the purge passage 20. An air cleaner 22 is positioned at an upstream-side end of the intake air pipe 19. A throttle valve 23 is disposed within the intake air pipe 19.

When the engine is stopped, the purge control valve 21 is closed, so that the communication between the canister 16 and the intake air pipe 19 is interrupted. On the other hand, during the operation of the engine, the purge control valve 21 is opened, while the air is drawn into the intake air pipe 19 via the air cleaner 22 under the control of the amount of the intake air by the throttle valve 19. Then, the negative pressure due to the intake air may be applied to the purge passage 20, so that the fuel content captured by the canister 16 can be purged and supplied to the engine via the purge passage 20.

The intermediate space 4 within the fuel tank 1 is in communication with the outside of the fuel tank 1 via an atmospheric communication passage 26. A bi-directional pump 27 is disposed within the atmospheric communication passage 26 and can feed a fluid in either direction within the atmospheric communication passage 26. A first temperature sensor 29 is disposed within the inner space within the inner tank wall 2 in order to detect the temperature within the fuel tank 1. A second sensor 30 is disposed externally of the fuel tank 1 in order to detect the environmental temperature. The first and second sensors 29 and 30 can output detection signals to a control unit 31. Based on the detection signals, the control unit 31 controls the operation timing of the pump 27, and the feeding direction and the feeding amount of a fluid to be fed by the pump 27. A gas permeable material is filled within the intermediate space 4 of the fuel tank 1. The gas permeable material may be a fibrous or granular material made of ceramic or resin, such as glass wool, or a porous material, such as a sponge, having a pore diameter larger than a molecular diameter of air. The gas permeable material has a heat conductivity that is lower than a heat conductivity of at least one of the inner tank wall 2 and the outer tank wall 3.

If the control unit 31 determines that the temperature externally of the fuel tank 1 is higher than the temperature within the fuel tank 1, i.e., the temperature within the inner space of the inner tank wall 2, based on the detection signals of the first and second sensors 29 and 30, the control unit 31 outputs a control signal to the pump 27, so that the pump 27 operates to evacuate the air within the intermediate space 4 to the external environment via the atmospheric communication passage 26. Because the amount of the air within the intermediate space 4, which serves as a heat transfer medium, is reduced, the heat transfer efficiency within the intermediate space 4 may be lowered. Therefore, it is possible to prevent the temperature within the fuel tank 1 from being increased by the heat of the external air.

On the contrary, if the control unit 31 determines that the temperature externally of the fuel tank 1 is lower than the temperature within the fuel tank 1 based on the detections signals of the first and second sensors 29 and 30, the control unit 31 outputs a control signal to the pump 27, so that the pump 27 operates to introduce the external air into the intermediate space 4 via the atmospheric communication passage 26. Because the external air having the temperature lower than the temperature within the fuel tank 1 is filled within the intermediate space 4, the fuel tank 1 can be cooled. In addition, because the air serving as a heat transfer medium is filled within the intermediate space 4, the heat transfer efficiency within the intermediate space 4 can be increased. In this way, the atmospheric communication passage 26 and the pump 29 serve as an introducing/evacuating device for introducing the air into the intermediate space 4 and for evacuating the air from the intermediate space 4. The introducing/evacuating device constitutes a heat transferring efficiency control device in conjunction with the air serving as a heat transfer medium.

Thus, during the transfer of heat through the air, the heat travels through molecules of nitrogen and oxygen contained in the air. If the amount of the air within the intermediate space 4 is small, i.e., if the pressure of air within the intermediate space 4 is low, the amount of air serving as a heat transfer medium is small. Therefore, the heat transfer efficiency is low. On the contrary, if the amount of air within the intermediate space 4 is large, i.e., if the pressure of air within the intermediate space 4 is high, the density of air is high. Therefore, the heat transfer efficiency is high. The heat transfer efficiency of air at the atmospheric pressure (101,325 Pa) is known to be a value of 0.02 W/m*K.

For the purpose of insulation of heat, it may be preferable that the amount of evacuation of air from the intermediate space 4 is as large as possible to the extent that the fuel tank 1 is not broken. However, it may be preferable that the intermediate space 4 is evacuated to have at least a negative pressure of a low vacuum level in the order of between $10^4$ to $10^2$ Pa, more preferably, an intermediate vacuum level in the order of between $10^2$ to $10^{-1}$ Pa. These expressions of the levels of vacuum are in compliance with JIS (Japanese Industrial Standards) Z8126-1. Evacuation to the low vacuum level in the order of between $10^4$ to $10^2$ Pa can reliably lower the heat transfer efficiency of the air in comparison with the atmospheric pressure. Evacuation to the intermediate vacuum level in the order of between $10^2$ to $10^{-1}$ Pa can lower the heat transfer efficiency of the air to a value of about $10^{-3}$ W/m*K.

On the other hand, for the purpose of dissipation of heat, it may be preferable that dissipation of heat is possible even if the pressure within the intermediate space 4 is in the order of the atmospheric pressure. More specifically, it may be preferable that the amount of introduction of air into the intermediate space 4 is as large as possible to the extent that the fuel tank is not broken. Preferably, the pressure within the intermediate space 4 is increased to be the level of $10^6$ Pa or more, and more preferably, the level of $10^{10}$ Pa or more. Introduction of air to achieve the pressure of about $10^6$ Pa or more can meaningfully increase the heat transfer efficiency of air in comparison with the atmospheric pressure. Introduction of air to achieve the pressure of about $10^{10}$ Pa or more can reliably significantly increase the heat transfer efficiency of air.

Second to Eighth embodiments of the present invention will now be described with reference to FIGS. 2 to 8. These embodiments are modification of the first embodiment. Therefore, in FIGS. 2 to 8, like members are given the same reference numerals as the first embodiment, and the description of these members will not be repeated.

Second Embodiment

Figure 2:
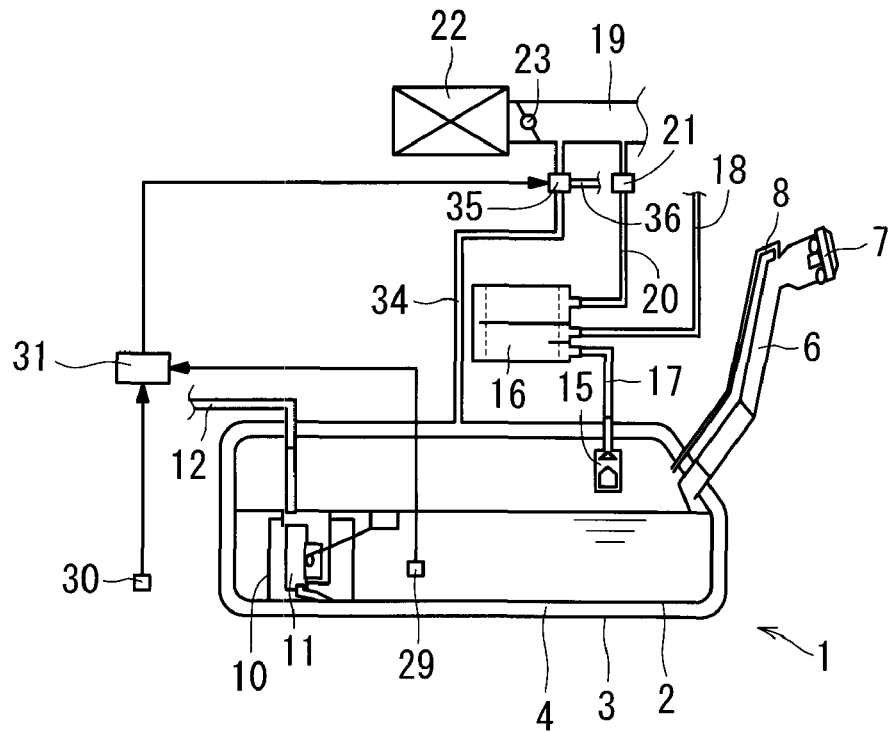
FIG. 2 is a structural view of a fuel tank system according to a second embodiment of the present invention.

A second embodiment will now be described with reference to FIG. 2. In this embodiment, an introducing/evacuating device for introducing the air into the intermediate space 4 and for evacuating the air from the intermediate space 4 utilizes the negative pressure of the intake air. As shown in FIG. 2, in this embodiment, in place of the atmospheric communication passage 26 of the first embodiment, a communication passage 34 is provided. The communication passage 34 serves to communicate between the intermediate space 4 and an intake air channel defined within the intake air pipe 19. A changeover valve 35 configured as a two-way valve is disposed in the midway of the communication passage 34. A communication passage 36 is connected to the communication passage 34 via the changeover valve 35. One end of the communication passage 36 is open into the external environment. When the changeover valve 35 is in a first position, the changeover valve 35 permits communication between the intermediate space 4 and the intake air channel of the intake air pipe 19 but prevents communication between the communication passage 34 and the communication passage 36. On the other hand, when the changeover valve 35 is in a second position, the changeover valve 35 prevents communication between the intermediate space 4 and the intake air channel of the intake air pipe 19 but permits communication between the communication passage 34 and the communication passage 36. The control unit 31 controls the position and the operation timing of the changeover valve 35.

If the control unit 31 determines that the temperature externally of the fuel tank 1 is higher than the temperature within the fuel tank 1 based on the detection signals of the first and second sensors 29 and 30, the control unit 31 outputs a control signal to the changeover valve 35, so that the changeover valve 35 is moved to the first position in order to permit communication between the intermediate space 4 and the intake air channel of the intake air pipe 19 but prevent communication between the communication passage 34 and the communication passage 36. Therefore, due to the negative pressure of air flowing through the intake air channel of the intake air pipe 19, the air within the intermediate space 4 is evacuated and drawn into the intake air pipe 19. Hence, the heat transfer efficiency within the intermediate space 4 is lowered to thermally insulate the inside of the fuel tank 1.

On the other hand, if the control unit 31 determines that the temperature externally of the fuel tank 1 is lower than the temperature within the fuel tank 1 based on the detection signals of the first and second sensors 29 and 30, the control unit 31 outputs a control signal to the changeover valve 35, so that the changeover valve 35 is moved to the second position in order to prevent communication between the intermediate space 4 and the intake air channel of the intake air pipe 19 but permit communication between the communication passage 34 and the communication passage 36. Therefore, the external air is introduced into the intermediate space 4 via the communication passages 34 and 36. Hence, the external air having a temperature lower than the temperature of the air within the intermediate space 4 is charged into the intermediate space 4, so that the fuel tank 1 can be cooled. In addition, because the air serving as a heat transfer medium is charged into the intermediate space 4, the heat transfer efficiency within the intermediate space 4 can be increased, so that it is possible to effectively dissipate the heat of the fuel tank 1.

In this way, the communication passages 34 and 35, the changeover valve 35 and the intake air pipe 19 serve as an introducing/evacuating device for introducing the air into the intermediate space 4 and for evacuating the air from the intermediate space 4. Similar to the first embodiment, the introducing/evacuating device constitutes a heat transferring efficiency control device in conjunction with the air serving as a heat transfer medium.

Third Embodiment

Figure 3:
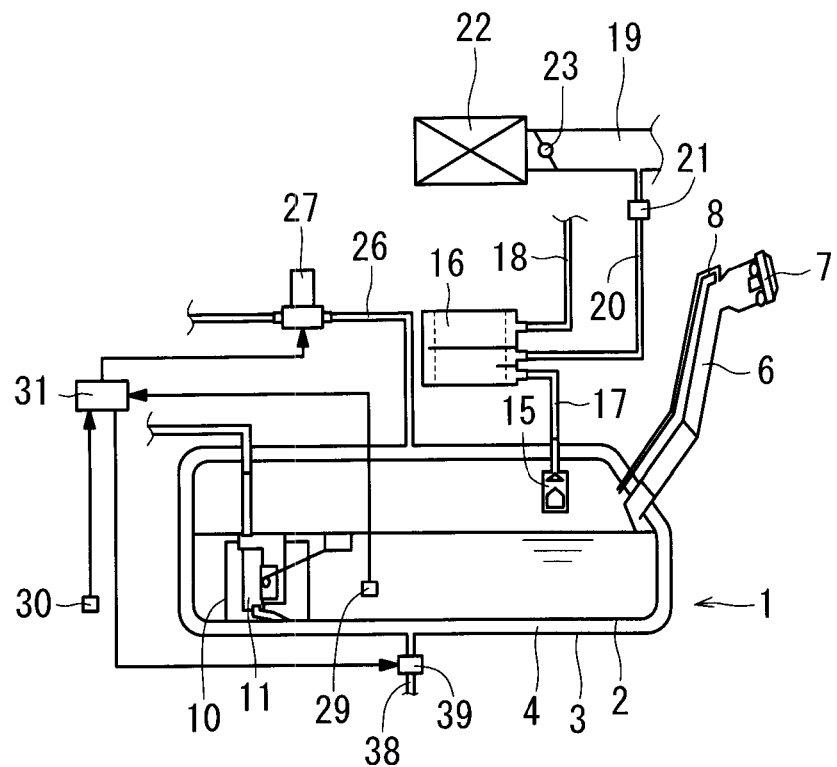
FIG. 3 is a structural view of a fuel tank system according to a third embodiment of the present invention.

A third embodiment will now be described with reference to FIG. 3. The third embodiment is different from the first embodiment in that, in addition to the atmospheric communication passage 26 and the pump 27, an atmospheric communication passage 38 and an open/close valve 39 are provided for serving as components of an introducing/evacuating device. As shown in FIG. 3, the atmospheric communication passage 38 is connected to the bottom of the fuel tank 1 at a position opposite to the atmospheric communication passage 26 that has the pump 27 therein. The atmospheric communication passage 38 has an upper end open into the intermediate space 4 and a lower end open into the external environment, so that the intermediate space 4 communicates with the external environment via the atmospheric communication passage 38. The open/close valve 39 is disposed in the midway of the atmospheric communication passage 38 in order to permit and prevent communication between the intermediate space 4 and the external environment. In this embodiment, the open/close valve 39 is configured as a solenoid valve that can be controlled by the control unit 31.

If the control unit 31 determines that the temperature externally of the fuel tank 1 is higher than the temperature within the fuel tank 1 based on the detection signals of the first and second sensors 29 and 30, the control unit 31 outputs a control signal to the open/close valve 39, so that the open/close valve 39 is closed to prevent communication between the intermediate space 4 and the external environment via the atmospheric communication passage 38. At the same time, the pump 27 is driven to evacuate the air within the intermediate space 4 to the external environment. As a result, the fuel storage space of the fuel tank 1 can be thermally insulated.

On the other hand, if the control unit 31 determines that the temperature externally of the fuel tank 1 is lower than the temperature within the fuel tank 1 based on the detection signals of the first and second sensors 29 and 30, the control unit 31 outputs a control signal to the open/close valve 39, so that the open/close valve 39 is opened to permit communication between the intermediate space 4 and the external environment via the atmospheric communication passage 38. At the same time, the pump 27 is driven to introduce the external air into the intermediate space 4 via the atmospheric communication passage 26. The air introduced into the intermediate space 4 may then be discharged to the external environment via the atmospheric communication passage 38. Alternatively, the pump 27 may be driven to draw the air within the intermediate space 4 and to then discharge the air to the external environment. Therefore, the external air may be introduced into the intermediate space 4 via the atmospheric communication passage 38. In either case, the external air flows through the intermediate space 4. Therefore, the external air having the temperature lower than the temperature within the intermediate space 4 is introduced into the intermediate space 4 to receive the heat from the fuel tank 1. The heated air is then discharged to the external environment. As a result, it is possible to effectively cool the fuel tank 1. In this embodiment, the pump 27 is driven only for the flow of air through the intermediate space 4. Therefore, in comparison with the arrangement of the first embodiment, the output required for the pump 27 may be small, and therefore, the supply of power to the pump 27 may be small. Also in this embodiment, the introducing/evacuating device constitutes a heat transferring efficiency change device in conjunction with the air serving as a heat transfer medium.

Fourth Embodiment

Figure 4:
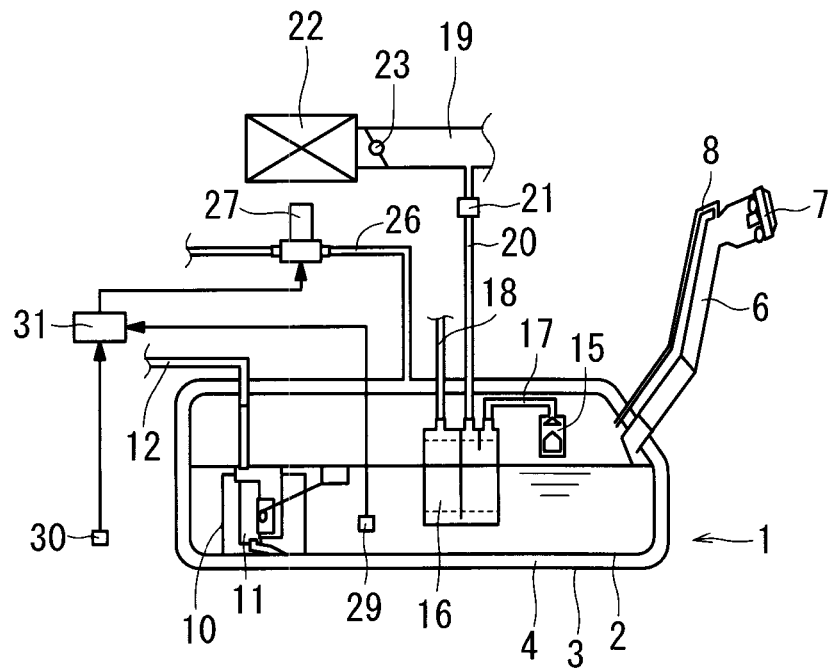
FIG. 4 is a structural view of a fuel tank system according to a fourth embodiment of the present invention.

A forth embodiment will now be described with reference to FIG. 4. This embodiment is different from the first embodiment in that the canister 16 is disposed within the fuel tank 1. In this connection, the vapor passage 17 is positioned within the fuel tank 1, and each of the purge passage 20 and the atmospheric passage 18 extends into and out of the fuel tank 1.

Fifth Embodiment

Figure 5:
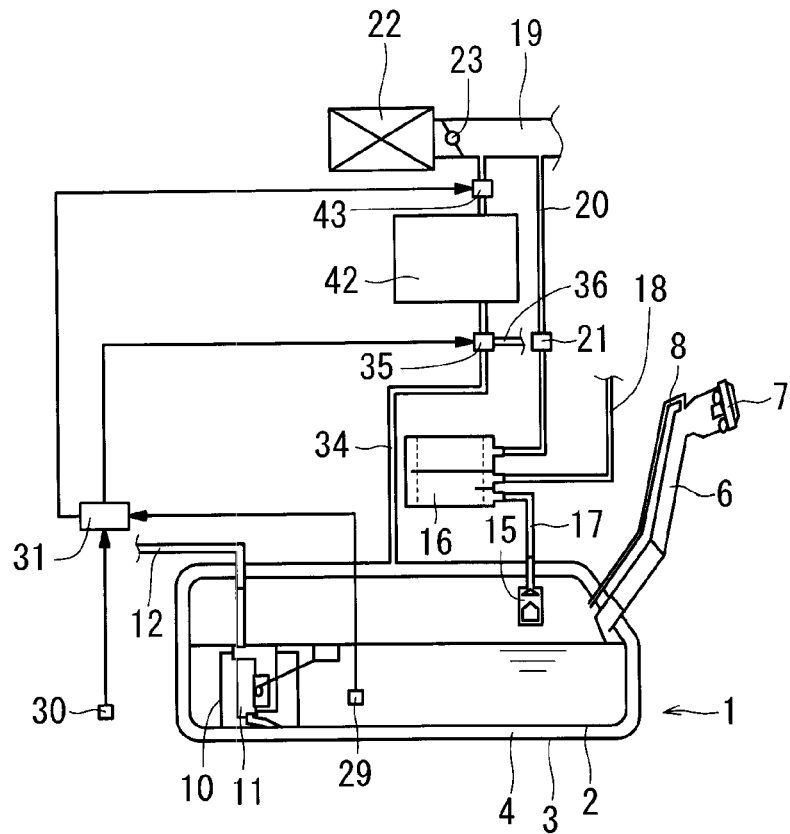
FIG. 5 is a structural view of a fuel tank system according to a fifth embodiment of the present invention.

A fifth embodiment will now be described with reference to FIG. 5. This embodiment is a modification of the second embodiment and is different from the second embodiment in that a pressure accumulator 42 is provided in an air passage 34 that communicates between the intermediate space 4 and the intake air channel of the intake air pipe 19. The pressure accumulator 42 can accumulate the negative pressure of the intake air produced within the intake air pipe 19. In this embodiment, the pressure accumulator 42 is a pressure-resistant cylinder. In addition, an open/close valve 43 is provided in the midway between the pressure accumulator 42 and the intake air pipe 19 of the air passage 34. The open/close valve 43 may be a solenoid valve and may be controlled by the control unit 31. More specifically, the open/close valve 43 is opened when the engine is in an operating condition. The open/close valve 43 is closed when the engine in a non-operating condition.

If the control unit 31 determines that the temperature externally of the fuel tank 1 is higher than the temperature within the fuel tank 1 based on the detection signals of the first and second sensors 29 and 30 during the operation of the engine, the control unit 31 outputs control signals to the changeover valve 35 and the open/close valve 43, so that the changeover valve 35 takes the first position and the open/close valve 43 is opened. Therefore, the intermediate space 4 and the intake air channel of the intake air pipe 19 communicates with each other, so that the air within the intermediate space 4 is evacuated and drawn into the intake air pipe 19 due to the negative pressure produced by the intake air in the same manner as the second embodiment.

On the other hand, if the control unit 31 determines that the temperature externally of the fuel tank 1 is lower than the temperature within the fuel tank 1 during the operation of the engine, the control unit 31 outputs a control signal to the changeover valve 35, so that the changeover valve 35 takes the second position, while the open/close valve 43 is held in the open position. Therefore, the changeover valve 35 prevents communication between the intermediate space 4 and intake air channel of the intake air pipe 19 but permits communication between the communication passage 34 and the communication passage 36. However, the pressure accumulator 42 is in communication with the intake pair pipe 19 via the open/close valve 43. Hence, the negative pressure of the intake air is accumulated within the pressure accumulator 42.

If the engine has stopped in the above condition, the control unit 31 outputs a control signal to the open/close valve 43, so that the open/close valve 43 is closed. In this situation, if the control unit 31 has determined that the temperature externally of the fuel tank 1 has become higher than the temperature within the fuel tank 1, the intermediate space 4 and the pressure accumulator 42 are brought to communicate with each other by the operation of the changeover valve 35, while the open/close valve 43 is closed. Therefore, even in the situation where the negative pressure from the intake air cannot be used for drawing the air within the intermediate space 4, it is possible to use the negative pressure stored within the pressure accumulator 42 for drawing the air within the intermediate space 4. For this reason, the pressure accumulator 42 preferably has a volumetric capacity that is equal to or larger than the volume of the intermediate space 4.

Sixth Embodiment

Figure 6:
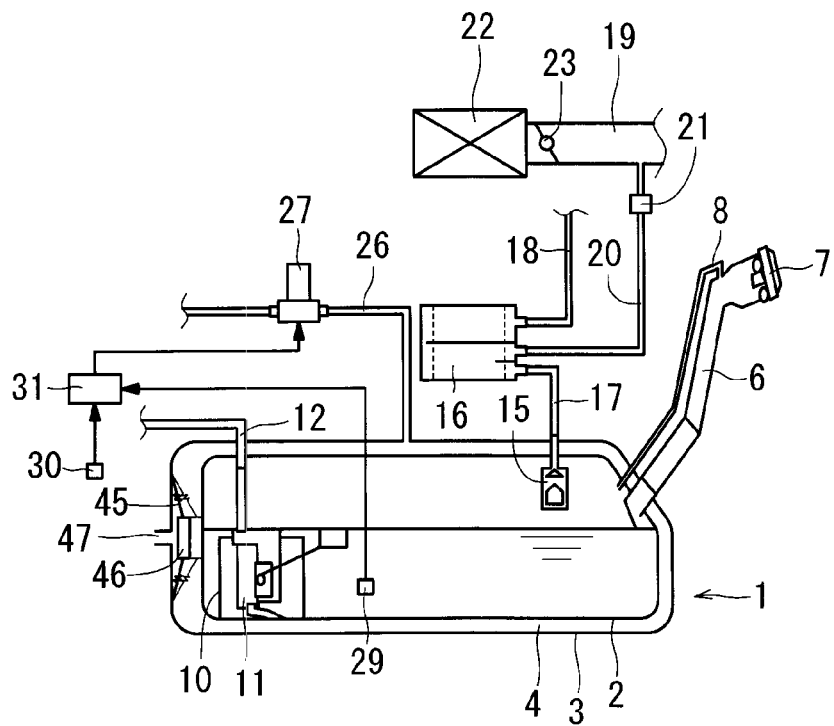
FIG. 6 is a structural view of a fuel tank system according to a sixth embodiment of the present invention.

A sixth embodiment will now be described with reference to FIG. 6. As shown in FIG. 6, a heat conductive member 46 having high heat conductivity is attached to the inner circumferential surface of the outer tank wall 3 via a diaphragm 45. The diaphragm 45 can resiliently deform to enable the heat conductive member 46 to move toward and away from the outer circumferential surface of the inner tank wall 2. The heat conductive member 46 is normally held away from the outer circumferential surface of the inner tank wall 2. The heat conductive member 46 may be made of metal, such as copper and aluminum, or any other materials other than metal as long as they have high heat conductivity.

The outer peripheral portion of the diaphragm 45 is secured to the inner circumferential surface of the outer tank wall 3 by means of welding. The inner peripheral portion of the diaphragm 45 is secured to the heat conductive member 46 also by means of welding. An atmospheric communication port 47 is formed in the outer tank wall 3 in a position opposing to the heat conductive member 46. The diaphragm 45 and the heat conductive member 46 interrupt the communication between the intermediate space 4 and the atmospheric communication port 47. Similar to the first embodiment, the atmospheric communication passage 26 is connected to the upper portion of the outer tank wall 3 and is in communication with the intermediate space 4. Also, the pump 27 is disposed within the atmospheric communication passage 26. However, as will be described below, the pump 27 operates in a manner opposite to the pump 27 of the first embodiment.

If the control unit 31 determines that the temperature externally of the fuel tank 1 is lower than the temperature within the fuel tank 1 based on the detection signals of the first and second sensors 29 and 30, the control unit 31 outputs a control signal to the pump 27, so that the pump 27 operates to evacuate the air within the intermediate space 4 to the environment via the atmospheric communication passage 26. Then, due to the reduction in pressure within the intermediate space 4, the heat conductive member 46 moves toward the inner tank wall 2 against the biasing force of the diaphragm 45 by the pressure of the external air applied to the heat conductive member 46 through the atmospheric communication port 47. As a result, the heat conductive member 46 is brought to contact with the outer circumferential surface of the inner tank wall 2. Hence, the heat of the inner tank wall 2 can be effectively dissipated to the external environment via the heat conductive member 46.

On the contrary, if the control unit 31 determines that the temperature externally of the fuel tank 1 is higher than the temperature within the fuel tank 1 based on the detection signals of the first and second sensors 29 and 30, the control unit 31 outputs a control signal to the pump 27, so that the pump 27 operates to introduce the external air into the intermediate space 4 via the atmospheric communication passage 26. Therefore, the pressure within the intermediate space 4 is increased to move the heat conductive member 46 away from the inner circumferential surface of the inner tank wall 2 with the aid of the biasing force of the diaphragm 46. Hence, the transfer of heat of the external air to the inner tank wall 2 can be restricted or minimized.

According to this embodiment, the pump 27 is used for actuating the heat conductive member 46. Therefore, the pump 27 is not necessary to be a high output pump as in the first embodiment. Practically, in the case of introduction of the external air into the intermediate space 4, it may be sufficient if the pressure within the intermediate space 4 becomes substantially equal to the atmospheric pressure. In the case of evacuation of the air within the intermediate space 4, it may be sufficient if the heat conductive member 46 is forced to move against the biasing force of the diaphragm 45. It is not necessary to evacuate the air within the intermediate space 4 to lower the pressure insomuch as the vacuum pressure required in the case of the first embodiment.

However, if the air is evacuated from the intermediate space 4 for moving the heat conductive member 46 to contact with the inner tank wall 2, the heat transfer efficiency within the intermediate space 4 may be lowered. Therefore, the heat conductivity, the heat capacity and/or the surface area of the heat conductive member 46 may preferably be sufficient to compensate for the reduction of the heat transfer efficiency within the intermediate space 4. The size and the configuration may be determined correspondingly.

As described above, the diaphragm 45 of this embodiment serves as a resilient member for supporting the heat conductive member 46. The atmospheric communication passage 26 and the pump serve as a pressure control device.

Seventh Embodiment

Figure 7:
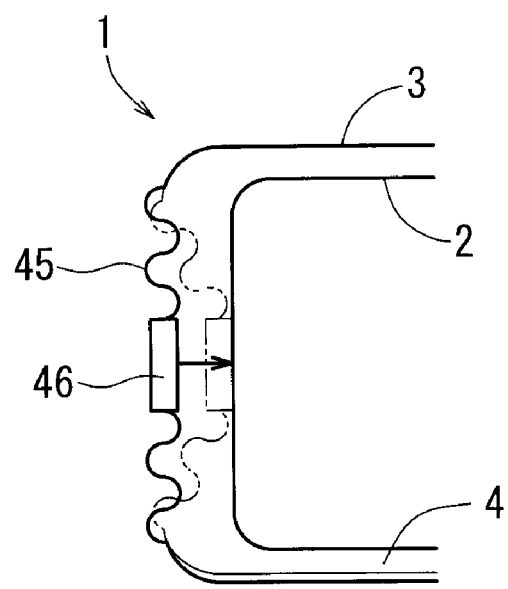
FIG. 7 is a structural view of a part of a fuel tank system according to a seventh embodiment of the present invention.

A seventh embodiment will now be described with reference to FIG. 7. This embodiment is a modification of the sixth embodiment and is different from the sixth embodiment in the arrangement of the diaphragm 45. In this embodiment, a part of the outer tank wall 3 itself is configured as the diaphragm 45. Therefore, the atmospheric communication port 47 of the sixth embodiment is not necessary to be provided. With the arrangement of the seventh embodiment, when the pressure within the intermediate space 4 is lowered, the heat conductive member 46 moves to contact the inner tank wall 2 by the pressure of the external air applied directly to the conductive member 46. Therefore, it is possible to reduce the number of parts of the fuel tank 1.

Eighth Embodiment

Figure 8:
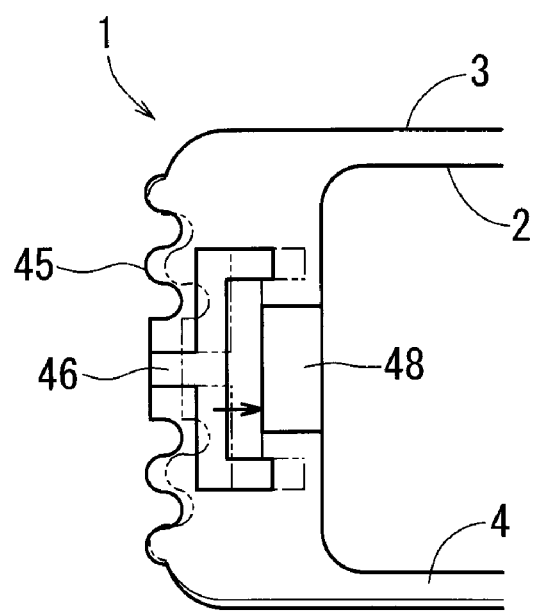
FIG. 8 is a structural view of a part of a fuel tank system according to an eighth embodiment of the present invention.

An eighth embodiment will now be described with reference to FIG. 8. This embodiment is a further modification of the seventh embodiment. In this embodiment, a second heat conductive member 48 having high heat conductivity is attached to the outer circumferential surface of the inner tank wall 2 in a position opposing to the heat conductive member 46. In addition, the heat conductive member 46 is configured to have a shape that can substantially enclose the second heat conductive member 48 when the heat conductive member 46 has moved toward the inner tank wall 2. Therefore, as the pressure within the intermediate space 4 is reduced, the heat conductive member 46 contacts the second heat conductive member 48, so that the heat within the fuel tank 1 can be dissipated to the external environment via the heat conductive members 46 and 48.

With this arrangement, because the second heat conductive member 48 always receives the heat from the inner tank wall 2, the heat can be readily transferred to the heat conductive member 46 when the heat conductive member 46 contacts the second heat conductive member. As a result, it is possible to effectively dissipate the heat to the external environment. In addition, because the heat conductive member 46 has a shape that can substantially receive and enclose the second heat conductive member 48, the contact area between the heat conductive members 46 and 48 can be increased to effectively transfer the heat.

The invention claims:

1. A fuel tank system comprising:
a fuel tank including an inner tank wall and an outer tank wall covering at least a part of the inner tank wall and spaced from the inner tank wall by a predetermined distance, so that an intermediate space is defined between the inner tank wall and the outer tank wall; and
a control device constructed to be able to change heat transfer efficiency within the intermediate space, wherein:
the control device comprises an introduction/evacuation device that can change the heat transfer efficiency within the intermediate space by using air as a heat transfer medium, and
the introduction/evacuation device comprises:
an environmental communication passage communicating between the intermediate space and the external environment; and
a bi-direction pump disposed in the environmental communication passage.

2. The fuel tank system as in claim 1, wherein the control device can decrease the heat transfer efficiency of the intermediate space when an external temperature externally of the outer tank wall is higher than a temperature within the inner tank wall.

3. The fuel tank system as in claim 1, wherein the control device can increase the heat transfer efficiency of the intermediate space when an external temperature externally of the outer tank wall is lower than a temperature within the inner tank wall.

4. The fuel tank system as in claim 1, wherein:
the introduction/evacuation device can evacuate an internal air within the intermediate space to an external environment externally of the outer tank wall when an external temperature externally of the outer tank wall is higher than a temperature within the inner tank wall; and
the introduction/evacuation device can introduce an external air externally of the outer tank wall into the intermediate space when the external temperature is lower than the temperature within the inner tank wall.

5. The fuel tank system as in claim 4, further comprising:
an air discharge device comprising:
a discharge passage communicating between the intermediate space and the external environment; and
an open/close valve disposed in the discharge passage, wherein:
the open/close valve is closed when the external temperature is higher than the temperature within the inner tank wall; and
the open/close valve is opened when the external temperature is lower than the temperature within the inner tank wall, so that the external air flowing into the intermediate space by the operation of the introduction/evacuation device can flow further to the external environment.

6. The fuel tank system as in claim 1, wherein:
the introduction/evacuation device comprises a communication passage communicating between the intermediate space and an intake air channel of an intake air pipe connected to an internal combustion engine; and
a control valve disposed therein, so that a negative pressure produced by an intake air flowing through the intake air channel can be applied to the intermediate space for evacuating the air when the control valve is opened.

7. The fuel tank system as in claim 6 further comprising a pressure accumulator disposed within the communication passage and between the valve and the intake air channel for accumulating the negative pressure produced by the intake air.

8. The fuel tank system as in claim 1, wherein a gas permeable material is filled within at least a part of the intermediate space, and the gas permeable material has a heat conductivity that is lower than a heat conductivity of at least one of the inner tank wall and the outer tank wall.

9. The fuel tank system as in claim 1, further comprising a canister disposed within the inner tank wall for adsorbing a fuel vapor produced within the inner tank wall.

10. A fuel tank system comprising:
a fuel tank including an inner tank wall and an outer tank wall covering at least a part of the inner tank wall and spaced from the inner tank wall by a predetermined distance, so that an intermediate space is defined between the inner tank wall and the outer tank wall; and
a pressure control device operable to change the pressure within the intermediate space; and
a heat conductive member supported on the outer tank wall via a resilient member, so that the heat conductive member can move toward and away relative to the inner tank wall;
wherein the heat conductive member is positioned away from the inner tank wall by a biasing force of the resilient member when an external temperature externally of the outer tank wall is higher than a temperature within the inner tank wall; and
wherein the pressure control device can reduce the pressure within the intermediate space to move the heat conductive member to contact with the inner tank wall against the biasing force of the resilient member when the external temperature is lower than the temperature within the inner tank wall.

11. The fuel tank system as in claim 10, wherein:
the pressure control device comprises:
an environmental communication passage communicating between the intermediate space and the external environment; and
a bi-direction pump disposed in the environmental communication passage.

12. The fuel tank system as in claim 10, wherein:
the pressure control device comprises a communication passage communicating between the intermediate space and an intake air channel of an intake air pipe connected to an internal combustion engine; and
a control valve disposed therein, so that a negative pressure produced by an intake air flowing through the intake air channel can be applied to the intermediate space for evacuating the air when the control valve is opened.

13. The fuel tank system as in claim 12 further comprising a pressure accumulator disposed within the communication passage and between the valve and the intake air channel for accumulating the negative pressure produced by the intake air.

14. The fuel tank system as in claim 10, wherein a gas permeable material is filled within at least a part of the intermediate space, and the gas permeable material has a heat conductivity that is lower than a heat conductivity of at least one of the inner tank wall and the outer tank wall.

15. The fuel tank system as in claim 10, further comprising a canister disposed within the inner tank wall for adsorbing a fuel vapor produced within the inner tank wall.

16. A fuel tank system comprising:
a fuel tank having a tank wall defining a fuel storage space;
a heat control chamber formed within the tank wall; and
a pressure control device constructed to control a pressure within the heat control chamber in response to a difference between a temperature within the fuel storage space and a temperature externally of the tank wall;
wherein the pressure control device comprises:
an environmental communication passage communicating between the heat control chamber and the external environment; and
a bi-direction pump disposed in the environmental communication passage.

17. The fuel tank system as in claim 16, wherein:
the tank wall comprises an inner tank wall and an outer tank wall defining the heat control chamber therebetween;
the fuel tank system further comprises a heat conductive member mounted to the outer tank wall and having a portion exposed to an environment externally of the outer tank wall; and
the heat conductive member can move between a first position away from the inner tank wall and a second position proximal to the inner tank wall in response to the pressure within the heat control chamber.

* * * * *